United States Patent [19]

Ito et al.

[11] Patent Number: 4,490,161
[45] Date of Patent: Dec. 25, 1984

[54] PILLARED STRUCTURE OF GAS-TREATING APPARATUS

[75] Inventors: Yoshifumi Ito; Kenichi Yanagi; Naoharu Shinoda; Seiji Higaki, all of Hiroshima, Japan

[73] Assignee: Mitsubishi Jukogyo Kabushiki Kaisha, Tokyo, Japan

[21] Appl. No.: 448,740

[22] Filed: Dec. 10, 1982

Related U.S. Application Data

[63] Continuation of Ser. No. 265,357, May 20, 1981, abandoned.

[30] Foreign Application Priority Data

May 23, 1980 [JP] Japan .................. 55-67723

[51] Int. Cl.³ .................................... B01D 53/06
[52] U.S. Cl. ........................ 55/181; 55/208; 55/269; 55/390
[58] Field of Search ............. 55/34, 77, 78, 99, 181, 55/208, 269, 390, 435, 474, 479, 182; 34/80, 95, 119, 124, 134; 432/233, 238

[56] References Cited

U.S. PATENT DOCUMENTS

| | | | |
|---|---|---|---|
| 1,590,266 | 6/1926 | Tiedtke et al. | 55/182 |
| 1,912,784 | 6/1933 | Miller et al. | 55/390 X |
| 2,083,732 | 6/1937 | Moore et al. | 55/208 X |
| 2,639,000 | 5/1953 | Edwards | 55/390 X |
| 3,197,944 | 8/1965 | Westeren et al. | 55/390 X |
| 3,789,916 | 2/1974 | Lindahl | 55/390 X |
| 3,812,798 | 5/1974 | Merkle, Jr. | 423/238 X |
| 4,046,525 | 9/1977 | Matsuo et al. | 55/390 X |
| 4,351,650 | 9/1982 | Shinoda et al. | 55/208 X |

FOREIGN PATENT DOCUMENTS

| | | | |
|---|---|---|---|
| 28260 | 8/1978 | Japan | 55/269 |
| 125181 | 9/1979 | Japan | 55/269 |
| 707093 | 4/1954 | United Kingdom | 55/208 |

Primary Examiner—Robert Spitzer
Attorney, Agent, or Firm—Toren, McGeady and Stanger

[57] ABSTRACT

A pillared structure of a gas-treating apparatus of a construction such that a plurality of chambers defined by partition members adjoin in a circular arrangement in the outer peripheral part of a rotary cage, each chamber being packed with an adsorbent, the cage being adapted to rotate, bringing the chambers by turns into at least an adsorption zone and then a desorption zone, characterized in that a plurality of hollow pillars for holding the partition members in place are rigidly joined at the lower ends to the upper surfaces of a plurality of rigid bottom beams radially extending from a central rotating shaft of the cage, and that holes are formed in the pillars for introducing a cooling fluid into the uprights.

4 Claims, 6 Drawing Figures

PILLARED STRUCTURE OF GAS-TREATING APPARATUS

This is a continuation of application Ser. No. 265,357, filed May 20, 1981, now abandoned.

This invention relates to a pillared structure of a gas-treating apparatus such as a dry exhaust gas desulfurization apparatus of a rotary-cage type for use in recovering and removing sulfur oxides from the combustion waste or exhaust gases from boilers, industrial furnaces and the like.

Generally, a gas-treating apparatus of this character comprises a turntable adapted to rotate about a vertical central shaft, and a rotary cage fixedly mounted on the turntable, the outer peripheral part of the cage being divided by partition members into a plurality of chambers that adjoin in a circular arrangement, each of the chambers being packed with an adsorbent. The rotary cage is segmented into an adsorption zone, a desorption zone, and, where necessary, a cooling zone located, in that order, circumferentially.

Combustion waste or exhaust gases enter the cage at the gas inlet formed in the adsorption zone, pass through the packed chambers located in that zone while being freed of sulfur oxides by the adsorbent, and leave the apparatus at the outlet. Meanwhile, the rotary cage is intermittently turned by suitable drives to shift one of the chambers from the adsorption to the desorption zone and the immediately preceding chamber from the desorption to the cooling zone or back to the adsorption zone. Inside the desorption zone, the adsorbent in the chamber is heated by clean vapor free from oxygen to drive off the sulfur oxides, and then it is cooled by an inert gas before the chamber is transferred back to the adsorption zone. Alternatively, the chamber after the desorption is moved to the cooling zone, where the adsorbent is cooled by a clean, inert gas, and then the chamber is returned to the adsorption zone.

The partition members are supported by pillars on rigid bottom beams extending radially from the central rotating shaft of the rotary cage. In the desorption zone where they are exposed to a hot gas, the pillars tend to be distorted by temperature stresses, deteriorating the sealability not only of the packed chambers but also between those chambers and the casings of the adsorption and desorption zones. The reduced sealability will allow the hot gas to leak out of the desorption zone into the chambers in the other zone. When this happens, the $SO_2$ gas once removed from the exhaust will mix back into the latter, lowering the desulfurization rate, or conversely the $O_2$-containing exhaust will gain entrance into the desorption zone, causing the hot adsorbent to burn and thereby posing fire hazards.

The present invention is proposed with the view to overcoming the foregoing difficulties, and it pertains to a pillared structure of a gas-treating apparatus of a construction such that a plurality of chambers defined by partition members adjoin in a circular arrangement in the outer peripheral part of a rotary cage, each chamber being packed with an adsorbent, the cage being adapted to rotate, bringing the chambers by turns into at least an adsorption zone and thence a desorption zone, characterized in that a plurality of hollow pillars for holding the partition members in place are rigidly joined at the lower ends to the upper surfaces of a plurality of rigid bottom beams radially extending from a central rotating shaft of the cage, and that holes are formed in the pillars for introducing a cooling fluid into the uprights.

According to the invention, as summarized above, the lower ends of the pillars that support the partition members of the chambers formed in the rotary cage of a gas-treating apparatus are rigidly joined to the upper surfaces of rigid bottom members extending radially from the central rotating shaft of the cage. The pillars are all secured to a common member of a low vertical rigidity or are engaged with a common upper frame, movably relative to the latter, so that the thermal stresses imposed on the pillars upon exposure to the hot gas in the desorption zone can be absorbed by the vertical displacement of the pillars. Thus, there is no danger of the pillars being distorted by dint of any excessive stresses.

In addition, the pillars are made hollow and are formed with holes for introducing a cooling fluid into the hollows and thereby cooling the pillars. This cooling system and the stress-relieving means common to the pillars combine to restrict the thermal stresses applicable to the pillars and minimize the pillar distortion. The combination of those features, moreover, improves the sealability of the essential parts and precludes the possibility of any decline in the desulfurization rate due to hot gas leakage from the desorption zone or, conversely, of any ingress of the $O_2$-containing exhaust into the chambers in the other zone to burn the adsorbent and cause a fire. The cooling fluid may be either sealed in the hollow pillars or allowed to flow into and out of the pillars.

The invention is also characterized by a heat-insulative covering of the pillars, whereby a temperature drop of the adsorbent in the chambers within the desorption zone is avoided and the pillars themselves are protected against the corrosive attacks of the hot gas.

The invention will now be described with reference to the accompanying drawings showing preferred embodiments thereof. In the drawings.

Figure 1:
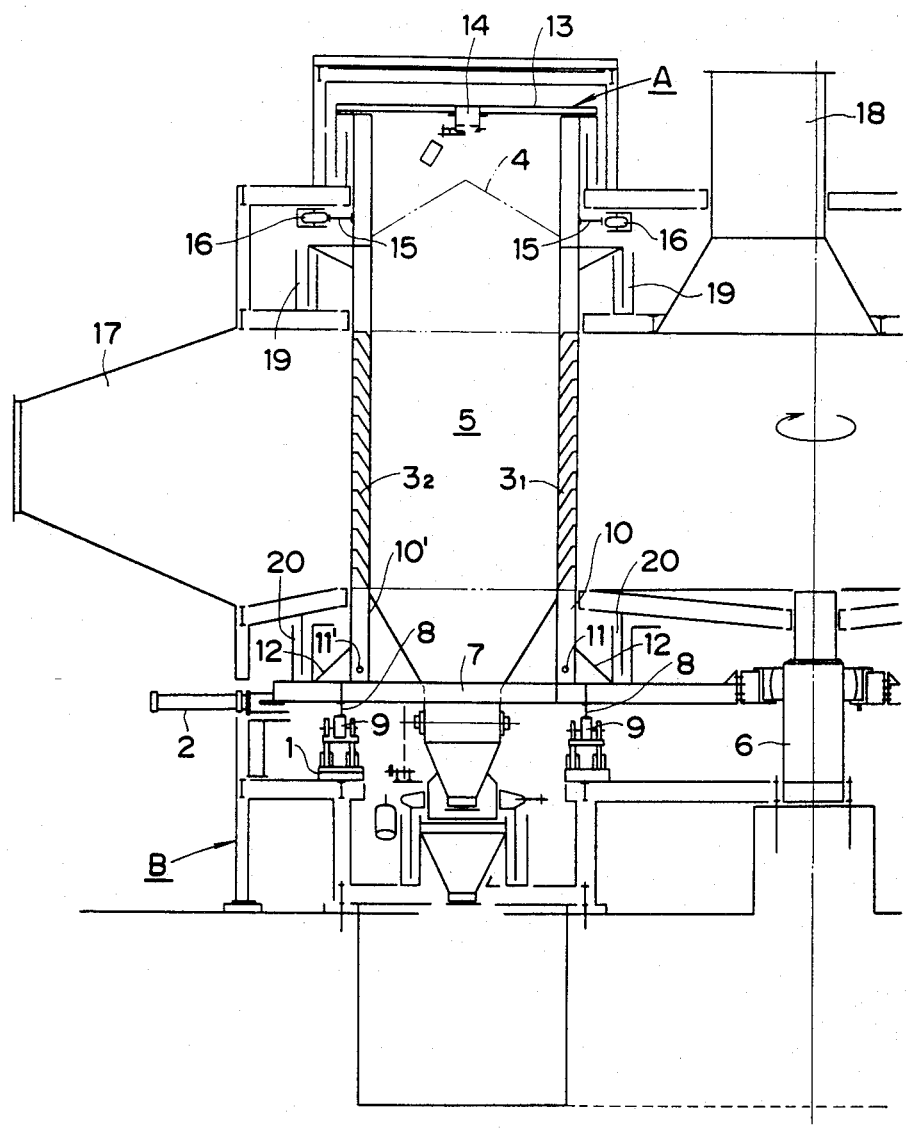
FIG. 1 is a partial view, in vertical section, of a gas-treating apparatus incorporating the pillared structure in accordance with the invention.
Figure 2:
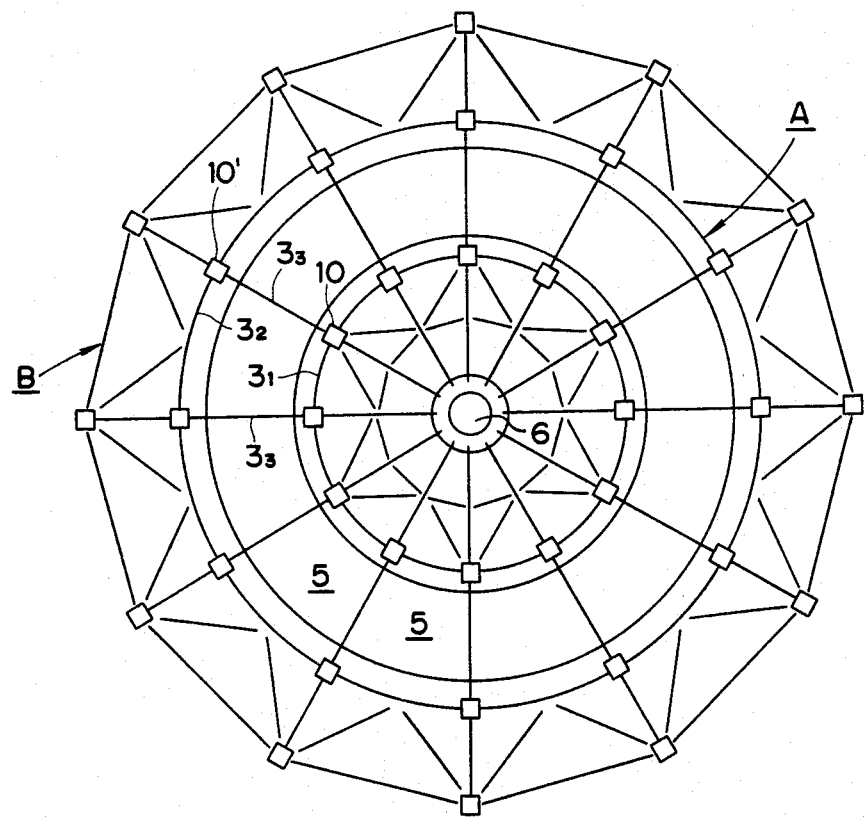
FIG. 2 is a transversely sectional view of the apparatus of FIG. 1.

Referring now to the drawings, specifically to FIGS. 1 and 2, a rotary cage A is shown rotatably supported by a disk-shaped table 1 on a stationary framework B of a gas-treating apparatus and adapted to be rotated by drives 2. In the outer peripheral part of the rotary cage A, there are provided a plurality of adsorbent-packed chambers 5 adjoining in a circular arrangement, the chambers being formed by a combination of an inner cylindrical partition member $3_1$, an outer cylindrical partition member $3_2$, and a plurality of radial partition members $3_3$ disposed at given intervals circumferentially in the annular space formed between the cylindrical partition members $3_1$ and $3_2$ so as to divide the space into a plurality of sectors. Each chamber is packed with an adsorbent 4, e.g. activated carbon.

From a central rotating shaft 6 for the rotary cage A, a plurality of rigid bottom beams 7 extend radially, and a pair of circular rails 8, attached to the under surfaces of the bottom beams, rest on rollers 9 held on the disk-shaped table 1.

Figure 3:
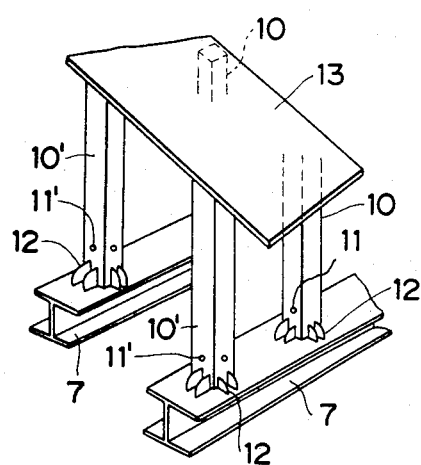
FIG. 3 is a fragmentary perspective view of an embodiment of the gas-treating apparatus according to the invention.
Figure 4:
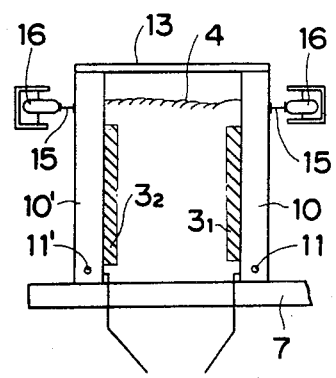
FIG. 4 is a vertical sectional view of the embodiment.

Hollow pillars 10, 10', square-shaped in cross section, are rigidly joined at lower ends to the upper surfaces of the bottom beams 7 at points, respectively, corresponding to the inner and outer peripheries of the annular space defining the packed chambers so as to support the partition members $3_1$, $3_2$, $3_3$ in position. As shown better in FIGS. 3 and 4, cooling-fluid holes 11, 11' are drilled in the pillars 10, 10', respectively, so that a cooling fluid can be introduced into the spaces inside the pillars through cooling-fluid lines (not shown) connected to the holes. The numeral 12 indicates stiffeners securely joining the pillars 10, 10' and each of the bottom beams 7 together.

An annular ceiling plate 13 is welded to the upper ends of the pillars 10, 10' to serve as a cover. The ceiling plate is formed with openings 14 as ports for supplying the adsorbent to the chambers underneath.

A circular rail 15 is attached to the inner faces of the pillars 10, and another rail 15 to the outer faces of the pillars 10', both adapted for moving in rolling contact with guide rollers 16 held by the stationary framework B.

FIG. 1 further shows an inlet 17 for exhaust gas to be treated, an outlet 18 for the treated gas, and water seals 19, 20.

Figure 5:
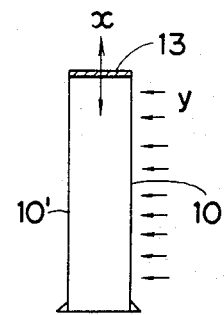
FIG. 5 is a view explanatory of actions applicable to the embodiment.

Thus, as each of the chambers 5 is moved into the desorption zone and exposed to the hot gas for desorption use, the portion of the annular ceiling plate 13 secured to and covering the upper ends of the pillars 10, 10' of the particular chamber tends to be displaced in the direction x, as indicated in FIG. 5, thereby absorbing the thermal expansion of those pillars. This is because the ceiling plate 13 has a great rigidity against the expansion of the pillars 10, 10' in the side pressure direction y whereas it is not so rigid in the direction x. Hence there is no possibility of the pillars 10, 10' being strained by excessive thermal stresses such that any surface distortion of the pillars forming seal surfaces of the seal means would invite any deterioration of the seal performance in the desorption zone.

The provision of the ceiling plate is combined with the cooling by means of the cooling fluid, introduced into the hollows of the pillars 10, 10' through the holes 11, 11', to control all the more positively the development of thermal stresses with the hot gas. This, in turn, produces improved sealing of the desorption zone.

The groups of inner pillars 10 and outer pillars 10' and the ceiling plate 13 welded to the both groups combinedly form a double multispan, rigid frame circumferentially of the rotary cage A. Radially, each set of inner and outer pillars 10, 10' and the ceiling plate 13 constitute a gatelike rigid frame component. The combined frame structure is solidly resistant to external forces. Horizontal forces to be exerted, as by earthquakes, will be borne by the stationary framework B by way of the rollers 16.

The pillars 10, 10' are covered with a heat-insulating material (not shown) to avoid a temperature drop of the adsorbent 4 in the chambers 5 and protect the pillars themselves against corrosion.

Figure 6:
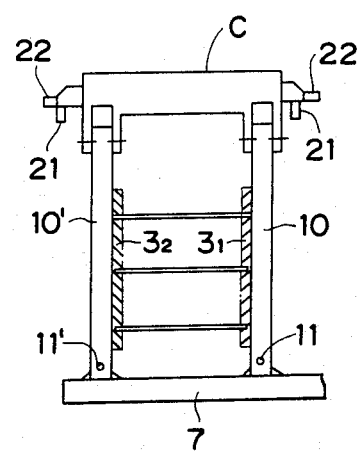
FIG. 6 is a vertically sectional side view of another embodiment of the invention.

FIG. 6 illustrates another embodiment of the invention, in which an annular frame C is revolvably supported by the stationary framework B through its downwardly extending rollers 21 and side rollers 22, and hollow, inner and outer pillars 10, 10', rigidly joined to the upper surface of each bottom beam 7, are engaged with, and made vertically movable relative to, the annular frame C, e.g., through bolts loosely fitted in slots formed in either the pillars 10, 10' or the annular frame C, so that the thermal stresses of the pillars can be absorbed. These pillars 10, 10' too are formed with holes 11, 11' for circulating a cooling fluid and are covered with a heat-insulating material not shown.

In FIG. 6 parts like or similar to those of the preceding embodiments are given like reference numerals.

While preferred embodiments of the invention have been described, it is to be understood that the invention is not limited thereto but that various changes and modifications may be made in the design without departing from the spirit and scope of the invention.

What is claimed is:

1. Gas-treatment apparatus comprising a rotary cage structure mounted for rotation about a vertical axis and including a plurality of adsorbent chambers arranged adjacent each other in a generally circular array, said adsorbent chambers being packed with an adsorbent material, gas flow means arranged on the periphery of said rotary cage structure for introducing gas into said adsorbent chambers at one angular location and for exhausting gas therefrom at another angular location, and drive means rotating said rotary cage structure about said vertical axis to move said adsorbent chambers in a rotary path relative to said gas flow means, said rotary cage structure comprising:

a plurality of rigid horizontal support beams extending radially from said vertical axis providing a lower support structure for said rotary cage structure;

a plurality of inner partition members arranged around said vertical axis along a first radially inner perimeter, each of said inner partition members defining respectively the radially innermost side of one of said adsorbent chambers;

a plurality of outer partition members arranged around said vertical axis along a second perimeter located radially outwardly from said first perimeter, each of said outer partition members being located radially opposite one of said inner partition members to define, respectively, the radially outermost side of one of said adsorbent chambers;

a plurality of radial partition members extending radially between said inner and outer partition members each defining on opposite sides thereof the angularly spaced sides of adjoining adsorbent chambers;

with the confines of each of said adsorbent chambers being defined on the radially outermost side by one of said outer partition members, on the radially innermost side by one of said inner partition members, and on the lateral sides thereof by a pair of said radial partition members; and a plurality of pillars extending vertically from said horizontal support beams and being supported thereon at the lower ends thereof, with one of said vertical pillars being arranged at each of the corners of each of said adsorbent chambers with each of said inner and outer partition members being structurally supported by said pillars and being structurally connected to said radial partition members by said pillars;

each of said pillars being constructed with a hollow interior extending vertically along the length thereof and with apertures formed at least in the lower regions of said pillars to enable introduction therethrough of a cooling fluid into the hollow interiors of said pillars thereby to provide a cooling effect for each of said adsorbent chambers; with said pillars and said horizontal support beams cooperating to provide a basic support structure for said gas treatment apparatus.

2. Apparatus according to claim 1 wherein said pillars are covered with a heat-insulating material.

3. Apparatus according to claim 1 wherein an annular ceiling plate is attached to the upper ends of said pillars.

4. Apparatus according to claim 1 wherein an annular frame is engaged with the upper ends of said pillars, in such a manner that said pillars are vertically movable with respect to said frame.

* * * * *